United States Patent [19]

Akao et al.

[11] Patent Number: 4,850,095

[45] Date of Patent: Jul. 25, 1989

[54] METHOD OF FORMING CROWNED SLIDING SURFACE IN MECHANICAL PART

[75] Inventors: Shigeaki Akao; Masato Taniguchi; Masaya Ito, all of Nagoya, Japan

[73] Assignee: NGK Spark Plug Co., Ltd., Nagoya, Japan

[21] Appl. No.: 196,682

[22] Filed: May 20, 1988

[30] Foreign Application Priority Data

May 22, 1987 [JP] Japan ................ 62-125380

[51] Int. Cl.$^4$ ............................................. B23P 11/02
[52] U.S. Cl. ................. 29/447; 29/156.7 B; 29/525; 29/157.1 A; 29/156.4 R; 74/569; 123/90.51
[58] Field of Search .............. 29/156.4 R, 156.7 B, 29/447, 525, 157.1 A; 123/90.48, 90.51, 90.44, 90.52; 74/569, 519; 403/273

[56] References Cited

U.S. PATENT DOCUMENTS

| | | | |
|---|---|---|---|
| 1,470,409 | 10/1923 | Wilcox | 123/90.51 |
| 2,089,749 | 8/1937 | Jardine | 29/447 X |
| 2,445,493 | 7/1948 | Priest | 74/569 |
| 2,768,475 | 10/1956 | Seelen et al. | 29/447 |
| 2,897,805 | 8/1959 | Etzler | 29/525 X |
| 3,025,841 | 3/1962 | Beckham | 123/90.52 |
| 3,064,342 | 11/1962 | Wagoner | 29/525 UX |
| 4,366,785 | 1/1983 | Goloff et al. | 123/90.51 |
| 4,508,067 | 4/1985 | Fuhrmann | 123/90.51 X |
| 4,768,476 | 9/1988 | Behnke et al. | 123/90.51 |
| 4,794,894 | 1/1989 | Gill | 29/156.7 B X |

FOREIGN PATENT DOCUMENTS

| | | | |
|---|---|---|---|
| 1311323 | 10/1962 | France | 29/447 |
| 379647 | 8/1964 | Switzerland | 29/447 |

*Primary Examiner*—Charlie T. Moon
*Attorney, Agent, or Firm*—Foley & Lardner, Schwartz, Jeffery, Schwaab, Mack, Blumenthal & Evans

[57] ABSTRACT

A mechanical part comprises a sliding section and a sleeve section which are prepared separately. The sliding section is made of a wear resisting material such as ceramics and formed with a planar sliding surface at one of the sides thereof. The sliding section is further formed with a joining portion at the outer periphery thereof. The sleeve section is made of metal and formed with a joining portion at the inner periphery thereof. The joining portions of the sliding section and the sleeve section are joined by interference fit or the like, whereby to allow the sliding surface of the sleeve section to be formed into a crowned shape.

7 Claims, 2 Drawing Sheets

(A)

(B)

METHOD OF FORMING CROWNED SLIDING SURFACE IN MECHANICAL PART

BACKGROUND OF THE INVENTION

1. Field of the Invention

The present invention relates to a method of forming a crowned or convex sliding surface in a mechanical part or element as for example a valve lifter, cam follower, rocker arm, valve stem, etc. of an internal combustion engine.

2. Description of the Prior Art

It is known that a sliding surface of a mechanical part is formed into a slightly crowned or convex shape in place of being formed into an exactly planer shape with a view to preventing misaligned contact with a sliding surface to be matched. An example of a crowned sliding surface is so shaped that the central portion protrudes from the peripheral portion by an amount ranging from several um to several tens um.

In the meantime, with a view to improving the wear resistivity, it has recently been practiced to form only the sliding section of a mechanical part from a material having a high wear resistivity as silicon nitride, silicon carbide, sialon, etc., and the remaining section from metal.

In case of forming such a crowned sliding surface in a sliding section made of a material having a high wear resistivity after the baking or firing of the sliding section, a problem of a considerably high cost is encountered. On the other hand, in case of forming such a crowned sliding surface in the sliding section before the baking or firing, another problem of a low dimensional accuracy of the sliding surface is encountered due to the large contraction or shrinkage of the sliding section occuring in case of the baking or firing.

SUMMARY OF THE INVENTION

In accordance with the present invention, there is provided a novel method of forming a crowned sliding surface in a part. The method comprises preparing a sliding section made of a wear resisting material and having opposite sides and an outer periphery between the sides, forming, at one of the sides, a planar sliding surface in the sliding section, forming, at the outer periphery, a joint portion in the sliding section, preparing a sleeve section made of metal and having such a length that is larger than the thickness of the sliding section, forming a joint portion in the sleeve section at an inner periphery thereof, and joining the joint portions of the sliding section and the sleeve section by interference fit and allowing the sliding surface of the sliding section to be formed into a crowned shape.

This method is effective for solving the above noted problems.

It is accordingly an object of the present invention to provide a novel method of forming a crowned or convex sliding surface in a mechanical part which can attain not only a reduced manufacturing expense but an increased accuracy.

It is a further object of the present invention to provide a novel method of the above described character which is quite useful for a valve lifter, cam follower, rocker arm, valve stem, etc. of an internal combustion engine.

DETAILED DESCRIPTION OF THE PREFERRED EMBODIMENTS

Figure 1:
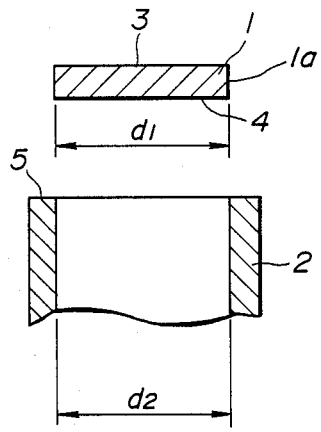
FIG. 1A is a sectional view of a mechanical part according to an embodiment of this invention and shown in a state before assembly.
FIG. 1B is the mechanical part of FIG. 1A in a state after assembly.
Figure 1:
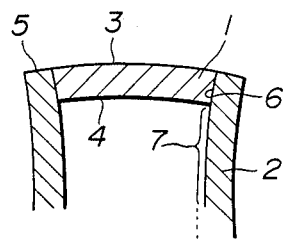

Referring to FIGS. 1A and 1B, a mechanical part or element according to an embodiment of this invention is shown as comprising a wear resisting section or sliding section 1 and a sleeve section 2 which are prepared separately. The sliding section 1 is in the form of a circular plate, i.e., the sliding section 1 has opposite sides and an outer periphery between the opposite sides whilst the sleeve section 2 is in the form of a tube or hollow cylindrical body. The sliding section 1 is formed with a sliding surface 3 at one of the sides thereof. The sliding section 1 is further formed with a joining portion 1a at the outer periphery thereof. The sleeve section 2 is formed with a joining portion 6 at the inner periphery thereof. The sleeve section 2 is sized so as to have such an inner diameter that is smaller by 0.3% or more than the outer diameter of the sliding section 1. The sleeve section 2 is further sized so as to have such a length that is larger than the thickness of the sliding section 1.

The sleeve section 2 is fitted on the sliding section 1, i.e., the joining portions 1a and 6 of the sliding section 1 and the sleeve section 2 are joined by interference fit, shrink fit or the like in such a way that the axial end face 5 of the sleeve section 2 is substantially flush with the sliding surface 3 of the sliding section 1 or the latter protrudes a little bit from the former.

When assembled as above, the sliding section 1 is deformed in such a way as to allow the sliding surface 3 to be formed into a crowned or convex shape. This is because the inner surface 4 is subjected to a larger compression force than the sliding surface 3, i.e., the sliding surface 3 is subjected to a compression force produced by the axially smaller joining area 6 of the sleeve section 2 whereas the inner side suface 4 is subjected to a compression force produced by the axially longer area 7 of the sleeve section 2.

Figure 2:
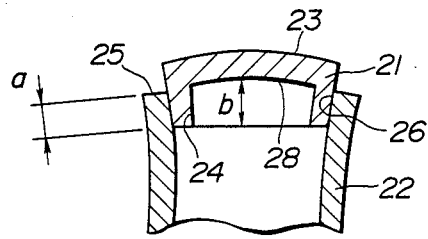
FIG. 2 is a sectional view of a mechanical part according to another emboidment of this invention.

As shown in FIG. 2, the inner side surface 24 of the sliding section 21 may be formed with a recess 28. When this is the case, the sliding section 21 deforms more easily and allows a sliding surface 23 to become convex more largely than the sliding surface 3 which is not formed with such a recess. On the other hand, when the length "a" of the joining portion 25 of the sleeve section 22 is determined so as to be smaller than the depth "b" of the recess 28, the sliding surface 23 becomes convex more largely than that in the case where $a \geq b$.

The sliding section 1 or 21 is preferably made of ceramics, i.e., a ceramic sintered body having a large toughness as for example a sintered body of silicon nitride, sialon, zirconia, etc. The material for the sleeve section 2 or 22 needs not to be a particular metal. But the thickness of the sleeve section needs to be suitably determined so that the sleeve section 2 or 22 is not subjected to such tension stress that exceeds the yielding point of the material forming the sleeve 2 or 22 at the time of force fitting of the sleeve section 2 or 22 on the sliding section 1 or 21 by a predetermined amount of interference.

Figure 3:
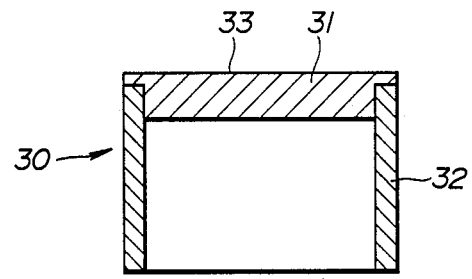
FIG. 3 is a variant of the embodiment of FIGS. 1A and 1B and shown as being applied to a valve lifter of the direct-acting type.

FIG. 3 shows a variant of the embodiment of FIGS. 1A and 1B. In this embodiment, the present invention is applied to a valve lifter 30 of the direct-acting type for an internal combustion engine.

The valve lifter 30 is 40 mm in outer diameter and 35 mm in height or length. the valve lifter 30 consists of a sliding section 31 formed from a sintered body of silicon nitride and a sleeve section 32 made of SUS 403 (a kind of stainless steel according to Japanese Industrial Standard). The sliding section 31 is 40 mm in outer diameter and 7 mm in height. The sliding section 31 is partly reduced in outer diameter so as to have an outer peripheral joining portion which is 5 mm in height or length. The sleeve section 32 is 35 mm in inner diameter. The sliding section 31 is grounded so that the straightness of the sliding surface 33 is 2 $\mu$m or less. The sleeve section 32 is then force fitted on the sliding section 31 by interference of 60 $\mu$m. By this, the centeral portion of the sliding surface 33 is caused to protrude from the peripheral portion by 2 to 3 $\mu$m. This fact was affirmed by the experiment conducted by the applicant.

Figure 4:
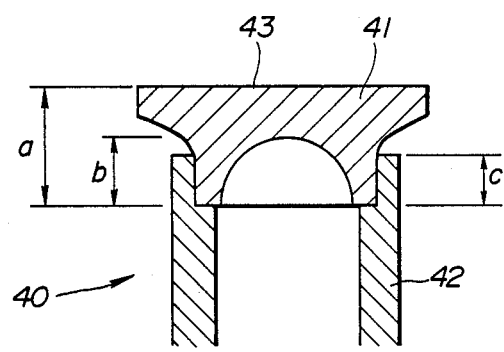
FIG. 4 is a fragmentary sectional view of a variant of the embodiment of FIG. 2 and shown as being applied to a cam follower.

FIG. 4 shows a variant of the embodiment of FIG. 3. In this embodiment, the present invention is applied to a cam follower 40 for an internal combustion engine.

The cam follower 40 consists of a sliding section 41 and a sleeve section 42. The sliding section 41 is formed from a sintered body of silicon nitride and sized so as to be 38 mm in outer diameter and 22 mm in height "a". The sliding section 41 is formed with a recess 48 which is 16 mm in depth "b". The sliding section 41 is partly reduced in outer diameter to have an outer peripheral joining portion which is 10 mm in height "c" and 24 mm in outer diameter. The sleeve section 42 is made of SUH 3 (a kind of heat resisting steel according to Japanese Industrial Standard) and sized so as to be 27 mm in outer diameter.

The sliding section 41 is grounded so that the straightness of the sliding surface 43 is 2 $\mu$m or less. The sleeve section 42 is then shrink fitted on the sliding section 41 by interference of 80 $\mu$m. By this, the centeral portion of the sliding surface 43 is convexed by 4 to 7 $\mu$m from the peripheral portion. This fact was affirmed by the experiment conducted by the applicant.

What is claimed is:

1. A method of forming a crowned sliding surface in a part, comprising:
    preparing a sliding section made of a wear resisting material and having opposite sides and an outer periphery betweeen said sides;
    forming, at one of said sides, a planar sliding surface in said sliding section;
    forming, at said outer periphery, a joining portion in said sliding section;
    preparing a sleeve section made of metal and having such a length that is larger than the thickness of said sliding section;
    forming a joining portion in said sleeve section at an inner periphery thereof; and
    joining said joining portions of said sliding section and said sleeve section by interference fit and allowing said sliding surface of said sliding section to be formed into a crowned shaped.
2. A method as set forth in claim 1 further comprising, before said joining, forming a recess in said sliding section at the other side thereof.
3. A method as set forth in claim 1 wherein said joining comprises making said sliding surface of said sliding section protrude from an adjacent end face of said sleeve section.
4. A method as set forth in claim 1 wherein said joining comprises making said sliding surface of said sliding section substantially flush with an adjacent end face of said sleeve section.
5. A method as set forth in claim 1 wherein said first mentioned preparing comprises forming said sliding section from ceramics.
6. A method as set forth in claim 1 wherein said second mentioned preparing comprises forming said sleeve section from a steel having a high heat resistivity.
7. A mehtod as set forth in claim 1 wherein said first mentioned preparing comprises forming said sliding section into a circular plate whilst said second mentioned preparing comprises forming said sleeve section into a hollow cylindrical body.

* * * * *